(12) United States Patent
Forster et al.

(10) Patent No.: US 8,820,510 B2
(45) Date of Patent: Sep. 2, 2014

(54) CONVEYOR AND A CONSTRUCTION MACHINE WITH A CONVEYOR

(75) Inventors: Hans Forster, Sabershausen (DE); Markus Meurer, Sinzig (DE); Thomas Haubrich, Goedenroth (DE)

(73) Assignee: BOMAG GmbH, Boppard (DE)

( * ) Notice: Subject to any disclaimer, the term of this patent is extended or adjusted under 35 U.S.C. 154(b) by 44 days.

(21) Appl. No.: 13/226,853

(22) Filed: Sep. 7, 2011

(65) Prior Publication Data

US 2012/0067692 A1    Mar. 22, 2012

(30) Foreign Application Priority Data

Sep. 7, 2010   (DE) .......................... 10 2010 044 650

(51) Int. Cl.
*B65G 41/00*    (2006.01)
*E01C 23/088*    (2006.01)

(52) U.S. Cl.
CPC ............ *E01C 23/088* (2013.01); *B65G 41/005* (2013.01)
USPC ........ 198/318; 198/312; 198/315; 198/316.1; 198/320; 198/861.5

(58) Field of Classification Search
USPC .............. 198/312, 313, 315, 316.1, 318, 320, 198/861.5; 414/353, 505, 527, 488, 489, 414/497, 502
See application file for complete search history.

(56) References Cited

U.S. PATENT DOCUMENTS

| | | | | |
|---|---|---|---|---|
| 946,008 | A | * | 1/1910 | Byers ............................ 198/318 |
| 1,374,728 | A | * | 4/1921 | Geier ......................... 198/307.1 |
| 1,798,045 | A | * | 3/1931 | Spangler ....................... 198/310 |
| 2,374,903 | A | * | 5/1945 | Spiegl ........................... 198/320 |
| 2,585,169 | A | * | 2/1952 | Potter ............................ 414/505 |
| 3,111,779 | A | * | 11/1963 | Ulrich ............................. 37/390 |
| 5,433,520 | A | * | 7/1995 | Adams et al. ..................... 366/8 |
| 7,299,676 | B1 | * | 11/2007 | Mueller et al. ................. 73/1.82 |

FOREIGN PATENT DOCUMENTS

CN             101509225 A    8/2009

OTHER PUBLICATIONS

Espacenet.com, English Machine Translation of CN101509225A, published on Aug. 19, 2009, retrieved from http://worldwide.espacent.com on Sepember 23, 2013 (9 pages).

* cited by examiner

*Primary Examiner* — Leslie A Nicholson, III
(74) *Attorney, Agent, or Firm* — Wood, Herron & Evans, LLP

(57) ABSTRACT

The present invention relates to a conveyor or a similar conveying means for mounting on a construction machine, and in particular a road surface milling machine, which conveyor can be linked with a coupling area to the construction machine in an articulated manner and is pivotable by way of a lifting apparatus with a loading area in relation to the construction machine.

16 Claims, 4 Drawing Sheets

CONVEYOR AND A CONSTRUCTION MACHINE WITH A CONVEYOR

CROSS-REFERENCE TO RELATED APPLICATIONS

The present application claims priority under 35 U.S.C. §119 of German Patent Application No. 10 2010 044 650.5, filed Sep. 7, 2010, the disclosure of which is hereby incorporated herein by reference in its entirety.

FIELD OF THE INVENTION

The present invention relates to a conveyor or a similar conveying means such as a conveyor belt or an endless conveyor for attachment to a construction machine and especially a road surface milling machine which can be linked to the construction machine in an articulated manner with a coupling area and is pivotable by way of a lifting apparatus with a loading area in relation to the construction machine, wherein the lifting apparatus comprises at least one actuating element which is fastened with at least one fixed area to the endless conveyor and can be brought into operative connection with the construction machine with an actuating area actively movable relative to the fixed area by way of at least one pulling element in such a way that the loading area of the conveyor pivots during a movement of the actuating area relative to the fixed area.

The present invention further relates to a construction machine and especially a road surface milling machine on which such a conveyor or such a conveying means is arranged.

BACKGROUND OF THE INVENTION

The aforementioned conveyors and construction machines provided with the same are known from the state of the art. The conveying means are preferably used for removing end products such as those obtained, e.g., during the milling of road surfaces. There are also construction machines, however, in which such conveying means are used for feeding construction materials.

There are different kinds of conveyors with respect to their configuration, wherein all conveyors or similar conveying means are comprised in the course of the present invention which can be pivotably arranged on a construction machine or similar machines. Therefore the present invention comprises conveyor belts, plate conveyors, continuous-flow conveyors, etc.

It is known from the state of the art to mount a conveyor on a construction machine in an articulated manner in such a way that it can be pivoted especially vertically by way of lifting cylinders or similar actuating elements in order to optimally enable, e.g., the loading of trucks of different height. Moreover, the conveyor is also dropped down to road level by way of the same actuating elements when it needs to be dismounted from the construction machine for specific applications. Depending on the construction, the actuating element remains on the dismounted conveyor, on the construction machine or on the conveyor.

Embodiments in which, e.g., a lifting cylinder remains on the construction machine have the disadvantage that the lifting cylinder that protrudes to the rear prevents reverse travel of the construction machine to an obstruction such as the wall of a building. In the case of a conveyor arranged on a road milling machine, it is therefore not possible to completely process the road surface. Moreover, the lifting cylinder represents a hazard for the machine operator because it protrudes from the construction machine in such a way that the operator may easily be injured by the same.

In the case of a conveyor equipped with such a lifting cylinder, coupling between the conveyor and the construction machine mostly occurs by way of a combination of a lifting cylinder and a pulling element, especially a steel cable or chain. It is thereby necessary, depending on the height of the truck to be loaded or when placing the conveyor on the ground or lifting it up from the ground, to shorten the chain that connects the lifting cylinder with the conveyor in an additional operating procedure by way of a shortening means for the pulling element. For this purpose, it is necessary to place the conveyor in a provided auxiliary cable and to relax the cylinder thereby.

In an embodiment in which the lifting cylinder is fastened to the conveyor, it is necessary that the lifting cylinder should be adapted with a large stroke, while the lifting cylinder remains on the belt in an extended position when the conveyor belt is placed on the ground and needs to be aligned parallel to the belt in a separate step. An additional aspect is that the cylinder needs to be fixed close to the upper conveyor belt and especially the loading area as a result of the required stroke, which has a negative effect on the lifting conditions between the machine and the conveyor. In particular, it is necessary to absorb high loads merely as a result of the lifting apparatus in addition to the conveying loads in such an arrangement of the lifting cylinder.

SUMMARY OF THE INVENTION

It is therefore the object of the present invention to provide a conveyor, or a construction machine with such a conveyor, in which an improved, more secure and effective pivoting capability of the conveyor is ensured and in which the security of the operating staff is also ensured in the storage and maintenance states.

This object is achieved by a conveyor or a similar conveying means for attachment to a construction machine, and especially a road surface milling machine, which can be linked to the construction machine in an articulated manner with a coupling area and is pivotable by way of a lifting apparatus with a loading area in relation to the construction machine, the lifting apparatus comprising at least one actuating element which is or can be fastened with a fixed area to the conveyor or the construction machine and can be brought into operative connection with the construction machine with an actuating area actively movable relative to the fixed area by way of at least one pulling element in such a way that especially the loading area of the conveyor pivots in case of a movement of the actuating area relative to the fixed area, a first deflecting element being provided on the conveyor by means of which the pulling element guided from the actuating area of the actuating element can be deflected and guided to the construction machine.

In particular, this object is also achieved by a construction machine with such a conveyor. In order to avoid redundancy, the following details made regarding the conveyor in accordance with the present invention are analogously applicable to any construction machine with such a conveyor. Such construction machines, however, are not described here in greater detail.

An important aspect of the conveyor in accordance with the present invention is the arrangement of a deflecting element on the conveyor which introduces into the construction machine the pivoting force initiated by the actuating element onto the pulling element and thereby causes a pivoting movement of the conveyor. A pulling element shall be understood within the terms of the present invention to be any element by means of which tensile forces can be diverted from the actuating element to the construction machine. Preferably, such a pulling element relates to a cable, especially a steel cable or chain. A loading area within the scope of the present invention shall be understood as an area which is arranged for supplying or delivering a conveyed item and especially for delivering a conveyed item to a truck.

The actuating element is arranged in such a way that it actively allows a relative movement between the fixed area and the actuating area, i.e., it is therefore driven hydraulically, electrically, pneumatically, or in any other similar way. By means of the pulling element arranged in the actuating area, relative movements can be diverted to the construction machine by way of deflection at the first deflecting element and the conveyor coupled to the first deflecting element can thus be moved.

Preferably, the actuating element or the lifting apparatus is arranged in such a way that the relative movement between the actuating area and the fixed area causes a vertical pivoting movement of the conveyor, i.e., a lifting or lowering of the bearing area.

According to an advantageous embodiment, the pulling element is configured and arranged on the conveyor in such a way that the loading area is lifted in case of a movement of the actuating area towards the fixed area and lowered in case of an opposite movement or vice versa. As soon as the actuating area is moved relative to the fixed area in such a way that it moves away from the same or towards the same, a lowering or lifting movement, in particular of the loading area of the conveyor, will be initiated.

In particular, the actuating element comprises a second deflecting element on the movable actuating area which forms a pulley system with the first deflecting element by means of the pulling element in such a way that the relative movement between the fixed area and the actuating area produces a multiply increased pivoting movement of the conveyor. This means that the actuating element, and especially its actuating area, are coupled with the pulling element in such a way that the relative movement between the actuating area and the fixed area on the actuating element produces a multiply increased movement of the conveyor. In the case of a pulley system with a fixed and a loose pulley, a transmission ratio of 1:2 is obtained so that a movement of the actuating area relative to the fixed area of 1 m results in a relative movement between the first deflecting element and the construction machine of 2 m. The second deflecting element acts in this case as the so-called "loose pulley" because it is moved for initiating the pivoting movement of the conveyor. The "fixed pulley" on the other hand is formed by the first deflecting element which is mounted in a stationary manner on the conveyor.

Preferably, the pulling element is fastened with a first mounting end at a first mounting point on the conveyor, and is guidable from there by way of at least the second deflecting element at the actuating area of the actuating element to at least the first deflecting element on the conveyor, and from there to the construction machine, and can be fastened there with a second mounting end. The previously described 1:2 transmission ratio is formed by the pulley system arranged in this way so that large pivoting movements can be realized at the conveyor with very small relative movements between the actuating area and the fixed area. This way, it is then possible to perform the movement throughout the full pivoting range of the conveyor, i.e., from a maximum loading height to its placement on the ground without any work on the pulling element and especially without the use of an auxiliary cable.

In a special embodiment, the first and/or the second deflecting element comprises at least one deflection pulley. The pulling element can be guided in the known manner by way of these deflection pulleys while frictional losses are minimized. Several deflection pulleys can be arranged on each deflecting element in pulley system arrangements with several (free and loose) pulleys. In this case, all forms of applications known from the state of the art for the realization of pulley systems and respective transmission ratios are applicable.

The actuating element is advantageously configured and arranged on the conveyor in such a way that the movement of the actuating area relative to the fixed area occurs essentially in an axis parallel to the main extension axis of the conveyor. As a result, the lifting apparatus is integrated in the conveyor in such a way that it does not entail any risk of injury both when in operation and when stored, i.e., when the conveyor is not linked to the construction machine. The actuating element can generally be arranged axially parallel or non-axially parallel to the conveyor.

In order to achieve an axially parallel alignment of the actuating element in relation to the main extension axis of the conveyor, the fixed area of the actuating element should preferably face the linkage area of the conveyor and the actuating area should face the loading area, or vice versa, at least in the maximum pivoted states of the conveyor, i.e., in the maximum upwardly pivoted state and in the maximum downwardly pivoted state, especially in the state when it is placed on the ground. Optimal leverage and loading conditions are in particular guaranteed by the arrangement of the actuating element in such a way that it faces with its fixed area towards the linkage area and especially is connected with the linkage area, because the main loads of the lifting apparatus are introduced directly into the construction machine in the linkage area.

In a particular embodiment, the actuating element is arranged in a stationary manner perpendicular to its main extension axis and essentially parallel to the main extension axis of the conveyor. The stationary arrangement of the actuating element represents a high security factor during the operation of the conveyor and especially during pivoting. It is thereby ensured that large parts of the lifting apparatus will not protrude from the conveyor during operation or in the stored state and cause a risk of injury. Moreover, the mostly sensitive actuating elements are optimally protected or protectable this way from mechanical influences, especially in the stored state.

The actuating element has, e.g., at least one lifting cylinder. Such a lifting cylinder can be, e.g., a hydraulically, pneumatically or electrically driven lifting cylinder, although in particular the use of hydraulic lifting cylinders allows an integration in most existing hydraulic systems of a construction machine. Such a lifting cylinder can fulfill the previously mentioned conditions concerning the axially parallel arrangement of the main extension axis of the conveyor particularly easily. By means of a lifting cylinder, movement of the actuating area, especially at the free end of a lifting cylinder rod relative to the fixed area of the lifting cylinder, is readily possible.

It is also possible that the actuating element comprises at least one cable winch or similar rotational actuating elements. As with a lifting cylinder, a compact arrangement of the actuating element on the conveyor is also possible by way of a cable winch, wherein the traction cable arranged on the cable winch forms the actuating area with its free end, which can then be brought into operative connection with a pulling element. A lifting apparatus is obtained by coupling the actuating element configured as a cable winch with the pulling element adapted as a pulley system, with which large pivoting movements of the conveyor and in particular its loading area can be achieved with few rotations of the winch. It would principally obviously also be possible to couple the cable winch and especially the movable mounting end of the cable winch directly with the construction machine via the first deflecting element without using the pulling element and in particular its pulley system arrangement. Nevertheless, the "coupled" arrangement has its advantages.

In order to mount the first mounting point and/or the first deflecting element, a mounting bridge is preferably provided on the conveyor which spans a conveying area of the conveyor while forming a cleared conveying area and on which the first mounting point and/or the first deflecting element are arranged. The mounting bridge serves to connect the pulling element and in particular the pulley system, while the adaptation as a mounting bridge and the formation of the cleared conveying area above the conveying area ensures the unobstructed transport of the material to be conveyed on the conveyor.

In a particular embodiment, the mounting bridge comprises at least two bridge bearings which are arranged on the conveyor on either side of the conveying area and connected with each other by way of at least one cross member element, wherein the first mounting point and/or the first deflecting element are arranged on the cross member element. The linkage preferably occurs here in the neutral axis on the cross member element.

It is also possible to arrange the mounting point and/or the first deflecting element and/or the second deflecting element in one plane perpendicular to the pivoting axis of the conveyor. This adaptation guarantees an unconstrained and compact configuration of a pulley system while preventing in particular the introduction of torsional loads to the conveyor.

It is also possible to adapt the mounting bridge to be movable along the conveyor via actuating or fastening elements. This ensures optimal adaptation of the force introduction point of the pulling element on the conveyor and a static optimization of the connection between the conveyor and the construction machine.

BRIEF DESCRIPTION OF THE DRAWINGS

The present invention is explained below in greater detail under reference to embodiments shown in the schematic drawings, wherein.

The same reference numerals are used below for the same and identically acting components, superscript indexes occasionally being used for the purposes of differentiation.

DETAILED DESCRIPTION OF THE INVENTION

Figure 1:
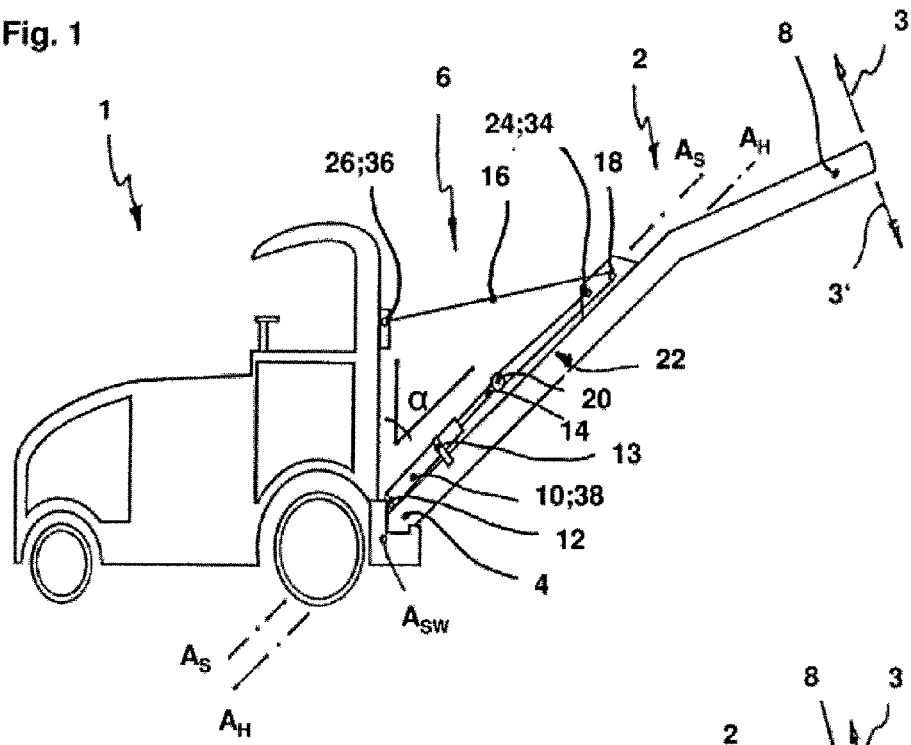
FIG. 1 shows a view of a first embodiment of the construction machine in accordance with the present invention.

FIG. 1 shows a schematic illustration of a first embodiment of the construction machine 1 in accordance with the present invention and the conveyor 2 in accordance with the present invention which is linked in a articulated manner to the construction machine 1. For this purpose, the conveyor 2 is fastened by way of a linkage area 4 to the construction machine 1 in such a way that it can be vertically pivoted by way of a lifting apparatus 6 (upwards and downwards in the drawing plane in this case) and about a pivoting axis $A_{SW}$. This way, in particular a loading area 8 of the conveyor can be moved upward and downward, as illustrated by the pivoting arrows 3, e.g., in order to adjust the loading area 8 to trucks of different heights.

In this embodiment of the conveyor 2 in accordance with the present invention, the lifting apparatus 6 is provided with an actuating element 10, which is adapted as a lifting cylinder 38. The actuating element 10 comprises a fixed area 12 with which it is fastened in a stationary manner and is especially screwed onto to the conveyor 2.

Moreover, the actuating element 10 comprises an actuating area 14 that is actively movable relative to the fixed area 12. This means that the distance between the actuating area 14 and the fixed area 12 is variable. Active movement is achieved in this case, for example, by configuring the lifting cylinder 38 as a hydraulically, electrically or pneumatically driven lifting cylinder and especially a linear motor.

In addition to coupling the actuating element 10 at the fixed area 12, an attachment element 13 is provided which connects the actuating element 10 in a stationary manner with the conveyor 2. By means of the fastening via the fixed area 12 and the attachment element 13, the actuating element 10 with its main extension axis $A_S$ is arranged essentially axially parallel to the main extension axis $A_H$ of the conveyor 2.

In order to initiate the pivoting movement of the conveyor 2 relative to the construction machine 1 in order to change in particular the schematically shown angle α, the actuating area 14 is statically coupled with the construction machine 1 via a pulling element 16 which is deflected at a first deflecting element 18.

The pulling element 16 is arranged in this embodiment in the form of a pulley system 22, wherein it is fastened with a first mounting end 24 at a first mounting point 34 on the conveyor 2 and is guided from there to a second deflecting element 20 on the actuating area 14 and from there back to the first deflecting element 18, from where it is coupled with a second mounting end 26 at a second mounting point 36 with the construction machine 1.

As a result, a pulley system 22 is formed with the first mounting point 34, the second deflecting element 20 and the first deflecting element 18, in which the second deflecting element 20 acts as a loose pulley and the first deflecting element 18 acts as a fixed pulley. A movement of the actuating area 14 and thus the second deflecting element 20 relative to the fixed area 12 and along the main extension axis $A_S$ of the actuating element 10 leads to a movement which is twice as large in the direction of the second mounting point 36 and thus to a strong pivoting of the conveyor 2 in the direction of the pivoting arrows 3 as well as about the linkage axis in the linkage area 4.

Figure 2:
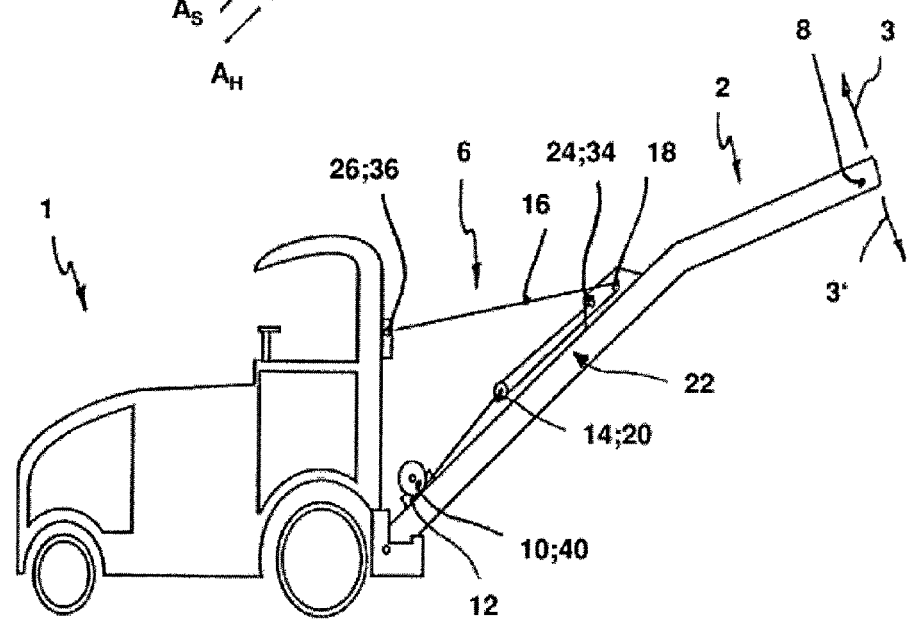
FIG. 2 shows a view of a second embodiment of the construction machine in accordance with the present invention.

FIG. 2 shows a second embodiment of a construction machine 1 to which an embodiment of the conveyor 2 in accordance with the present invention is attached in an articulated manner. By means of a lifting apparatus 6, which is provided here as well, the conveyor 2 can be pivoted relative to the construction machine 1 in order to pivot in particular the loading area 8 in the direction shown by the arrows 3 illustrating the pivot movement.

The lifting apparatus 6 also comprises an actuating element 10 here as well, which is configured as a cable winch 40 in contrast to the previously discussed embodiment. The cable winch 40 is fastened to a fixed area 12 on the conveyor 2 and coupled with an actuating area 14 by means of a pulling element 16, which in turn is in operational connection with the construction machine 1 in a deflected manner by way of a first deflecting element 18. The pulling element 16 is adapted as a pulley system 22 here as well and is again attached with a first mounting end 24 at a first mounting point 34 on the conveyor 2 and with a second mounting end 26 at a second mounting point 36 on the construction machine 1. The loose pulley of the pulley system 22 again forms a second deflecting element 20 adapted on the actuating element 14, whereas the fixed pulley is formed by the first deflecting element 18. In this respect, the transmission ratio of the formed pulley system corresponds to the previously described embodiment.

Figure 3:
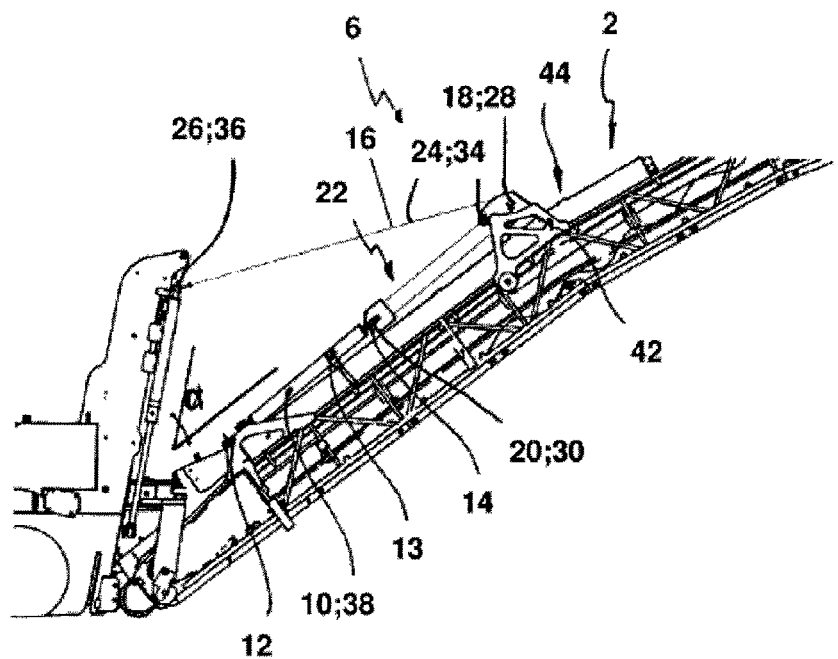
FIGS. 3 and 4 show detailed views of the embodiment according to FIG. 1 in different pivoting states of a linked conveyor.
Figure 4:
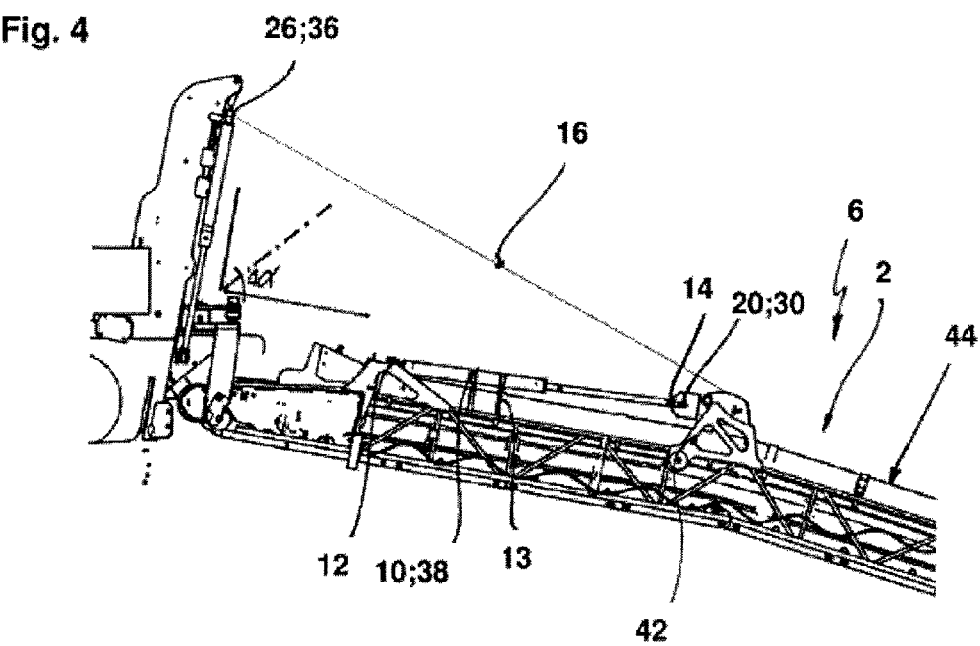

FIGS. 3 and 4 show the embodiment of the conveyor 2 as shown in FIG. 1 and in particular its lifting apparatus 6 in greater detail, FIG. 3 showing a lifted state and FIG. 4 showing a state in which the conveyor 2 is placed on the ground.

The actuating element 10 is shown again adapted as a lifting cylinder 38 that is arranged via the fixed area 12 and the attachment element 13 axially parallel to the conveyor 2. The drawing also shows the actuating area 14, which is actively movable relative to the fixed area 12 and on which the second deflecting element 20 is adapted with a deflection pulley 30. Such a deflection pulley 28 is accordingly also provided on the first deflecting element 18.

A mounting bridge 42, shown adapted on the conveyor 2, spans a conveying area 44 of the conveyor 2 in such a way that material to be conveyed on the conveying area 44 can be carried to the loading area 8 (FIG. 1) or removed from the same.

In order to convert a relative movement executed by a movement of the actuating area 14 relative to the fixed area 12 into a pivoting movement of the conveyor relative to the construction machine 1, the actuating area 14 is coupled with the construction machine 1 via the pulling element 16. For this purpose, the pulling element 16 runs from the first mounting point 34, where it is attached to the first mounting end 24, to the second deflecting element 20, from there to the first deflecting element 18 on the mounting bridge 42 and from there to the construction machine 1, where it is fastened with the second mounting end 26 at the second mounting point 36 of the construction machine 1.

As shown in FIGS. 3 and 4, only a small lifting motion is necessary in order to pivot the conveyor 2 about a large angle $\Delta\alpha$ as a result of the thus formed pulley system 22 and the coupling in accordance with the present invention between the actuating element 10 and the second mounting point 36 on the construction machine 1.

Figure 5:
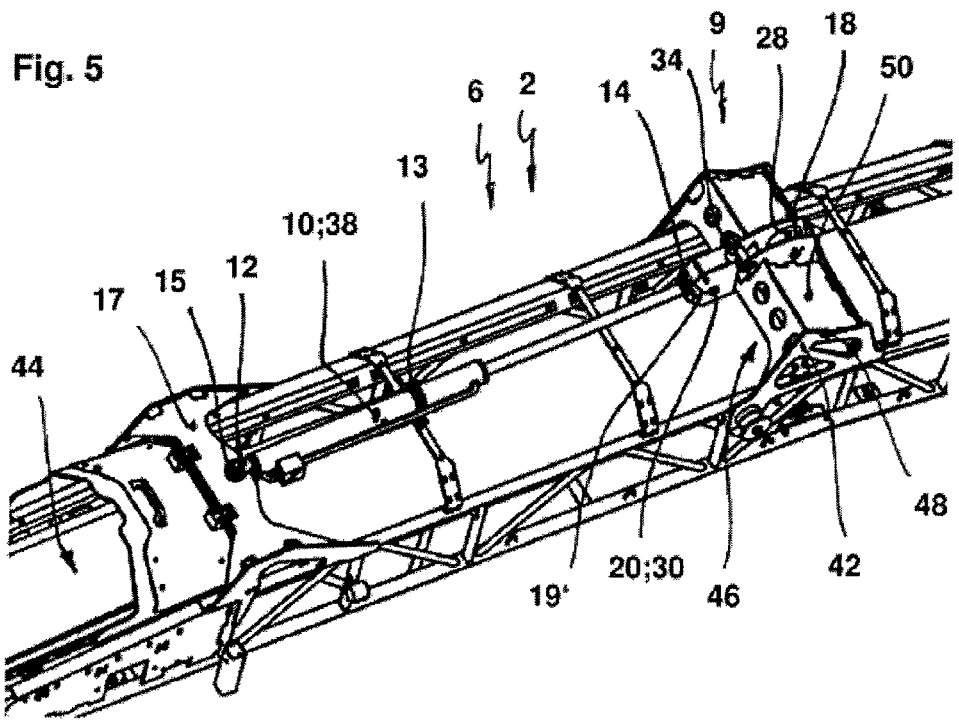
FIG. 5 shows a detailed view of the actuating element used for pivoting the embodiment of FIG. 1.

FIG. 5 shows the actuating element 10 or lifting cylinder 38 already shown in detail in FIGS. 3 and 4, this drawing explicitly showing the configuration of the fixed area 12. Provided in the fixed area 12 is a pin element 15, by means of which the actuating element 10 is attached in a stationary manner on the conveyor 2 or a mounting frame 17. Additional fixing occurs by means of the attachment element 13, which fixes the actuating element 10 and its "static component" in a stationary manner and essentially axially parallel to the conveyor 2.

The drawing further shows the coupling area 9 of the lifting apparatus 6, which coupling area is used for forming the pulley system (cf. especially FIGS. 3 and 4). The coupling area 9 comprises the mounting bridge 42, which is attached to the conveyor 2 by way of two bridge bearings 48. The two bridge bearings 48 are connected via a cross member element 50 while forming a cleared conveying area 46 for the material to be conveyed (not shown) conveyed on the conveyor 2, especially in a conveying area 44.

The first mounting point 34, which is used for fastening the first mounting end 24 of the pulling element 16 (see FIGS. 3 and 4), is arranged on the cross member element 50. Also arranged on the cross member element 50 is the first deflecting element 18, which with its deflection pulley 28 is used to deflect the pulling element 16 between the actuating area 14 of the actuating element 10 and the second mounting point 36 of the construction machine 1 (see FIGS. 3 and 4).

In order to guarantee a secure guidance of the pulling element 16 (see FIGS. 3, 4 and especially 7), the actuating area 14 as well as the second deflecting element 20 with its deflection pulley 30 which is arranged there, the first mounting point 34 adapted on the cross member element 50 and the first deflecting element 18 with its deflection pulley 28 comprise guide elements 19 which laterally cover in particular the deflection pulleys 28 and 30.

Figure 6:
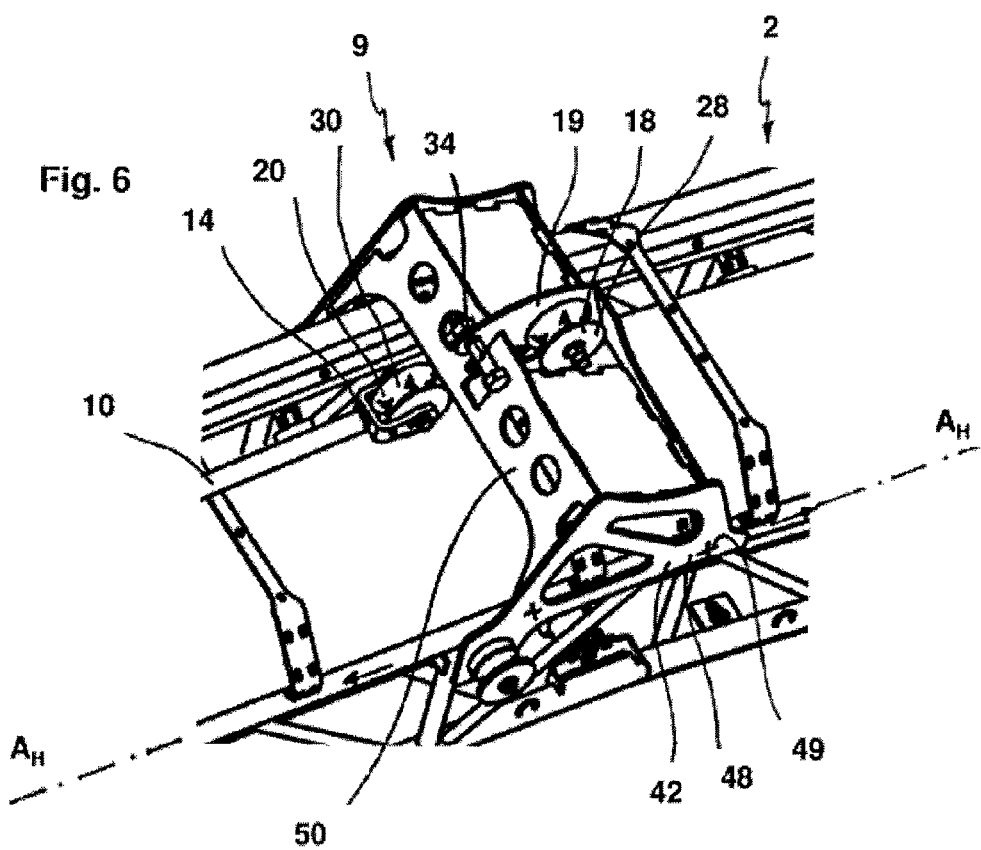
FIG. 6 shows a detailed view of an actuating or coupling area of the illustration of FIG. 5.

The coupling area 9 as shown in FIG. 5 is shown in FIG. 6 in a partly sectional view, while in particular the guide elements 19 are shown in a partly sectional view. The figure shows the actuating element 10 with its actuating area 14 on which the second deflecting element 20 is arranged with its deflection pulley 30.

The figure also shows the mounting bridge 42, consisting of the bridge bearings 48 and the cross member element 50 on which the first deflecting element 18 with its deflection pulley 28 and the first mounting point 34 are arranged. In this embodiment, the mounting bridge 42 is movable along the conveyor 2, i.e., parallel to its main extension axis $A_H$, and can be fixed at different mounting points via fixing elements 49. As a result, optimal adaptation of the geometrical relationship between the construction machine 1 and the first deflecting element 28 in the conveyor 2 can be adjusted.

Figure 7:
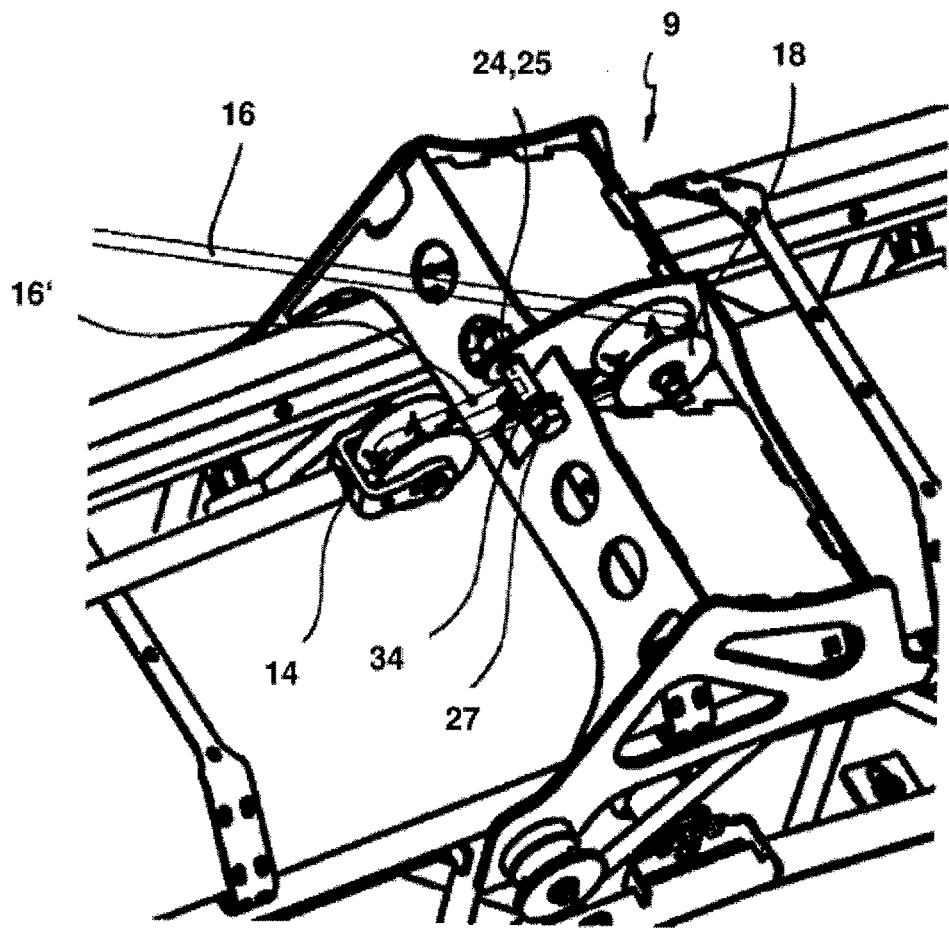
FIG. 7 shows a further view of the actuating or coupling area of the illustration of FIG. 5 with engaged pulling element.

FIG. 7 shows the coupling area 9 as shown in FIG. 6 with the engaged pulling element 16, wherein the illustrated relative position between the actuating area 14 and the first deflecting element 18 corresponds t the conveyor 2 in the completely downward pivoted state shown in FIG. 4.

In this figure, the pulling element 16 is adapted as a chain that is fixed with its first mounting end 24, formed here by the last chain link 25, at a first mounting point 34 adapted as a locking pin 27. Similar fixing is even possible on the construction machine itself, wherein a toolless fixing element, e.g., a carabiner element, is preferably used instead of a locking pin 27.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

The invention claimed is:

1. A conveyor for mounting on a construction machine, the conveyor having a loading area and being linked via a coupling area to the construction machine in an articulated manner so as to be pivotable by way of a lifting apparatus in relation to the construction machine, wherein the lifting apparatus comprises at least one actuating element having a fixed area and an actuating area which is actively movable relative to the fixed area, the at least one actuating element being fastened via the fixed area to the conveyor or the construction machine and which at least one actuating element is brought into operational connection with the construction machine via at least one pulling element in such a way that the loading area pivots in response to a movement of the actuating area relative to the fixed area, wherein a first deflecting element is provided on the conveyor by means of which the at least one pulling element is guided from the actuating area of the at least one actuating element and is deflected and guided to the construction machine, wherein a mounting bridge which essentially spans a conveying area of the conveyor while forming a cleared conveying area and on which a first mounting point and/or the first deflecting element are/is arranged, and wherein the mounting bridge comprises at least two bridge bearings which are arranged on the conveyor on either side of the conveying area and are connected with each other via at least one cross member element, the first mounting point and/or the first deflecting element being arranged on the cross member element.

2. The conveyor according to claim 1, wherein the at least one pulling element is configured and arranged on the conveyor in such a way that the loading area is lifted in response to a movement of the actuating area towards the fixed area and is lowered in response to an opposite movement or vice versa.

3. The conveyor according to claim 1, wherein the at least one actuating element comprises a second deflecting element in the movable actuating area, which second deflecting element forms a pulley system with the first deflecting element by means of the at least one pulling element in such a way that the relative movement between the fixed area and the actuating area produces a multiply increased pivoting movement of the conveyor.

4. The conveyor according to claim 3, wherein the at least one pulling element is fastened to a first mounting end at a first mounting point on the conveyor, is guidable from the first mounting point via at least the second deflecting element on the actuating area of the at least one actuating element to at least the first deflecting element on the conveyor and from the first deflecting element to the construction machine, and can be fastened to the construction machine with a second mounting end.

5. The conveyor according to claim 3, wherein the first and/or the second deflecting element comprise/comprises at least one deflection pulley.

6. The conveyor according to claim 3, wherein a mounting point and/or the first deflecting element and/or the second deflecting element are arranged in a plane perpendicular to the pivoting axis $A_{SW}$ of the conveyor.

7. The conveyor according to claim 1, wherein the at least one actuating element is configured and arranged on the conveyor in such a way that the movement of the actuating area occurs essentially in one axis parallel to a main extension axis $A_H$ of the conveyor.

8. The conveyor according to claim 1, wherein, at least in the maximally pivoted state of the conveyor, the fixed area of the at least one actuating element faces a linkage area of the conveyor and the actuating area faces the loading area or vice versa.

9. The conveyor according to claim 1, wherein the at least one actuating element is arranged with its main extension axis $A_S$ essentially parallel to a main extension axis $A_H$ of the conveyor.

10. The conveyor according to claim 1, wherein the at least one actuating element comprises at least one lifting cylinder.

11. The conveyor according to claim 1, wherein the at least one actuating element comprises at least one rotational actuating element.

12. The conveyor according to claim 11, wherein the at least one rotational actuating element comprises a cable winch.

13. The conveyor according to claim 1, wherein the mounting bridge is arranged to be movable along the conveyor, in particular along a main extension axis $A_S$ of the conveyor.

14. A construction machine to which the conveyor according to claim 1 is linked.

15. The construction machine according to claim 14, wherein the construction machine comprises a road surface milling machine.

16. A conveyor for mounting on a construction machine, the conveyor having a loading area and being linked via a coupling area to the construction machine in an articulated manner so as to be pivotable by way of a lifting apparatus in relation to the construction machine, wherein the lifting apparatus comprises at least one actuating element having a fixed area and an actuating area which is actively movable relative to the fixed area, the at least one actuating element being fastened via the fixed area to the conveyor or the construction machine and which at least one actuating element is brought into operational connection with the construction machine via at least one pulling element in such a way that the loading area pivots in response to a movement of the actuating area relative to the fixed area, wherein a first deflecting element is provided on the conveyor by means of which the at least one pulling element is guided from the actuating area of the at least one actuating element and is deflected and guided to the construction machine, wherein a mounting bridge which essentially spans a conveying area of the conveyor while forming a cleared conveying area and on which a first mounting point and/or the first deflecting element are/is arranged, and wherein the mounting bridge is arranged to be movable along the conveyor, in particular along a main extension axis $A_S$ of the conveyor.

* * * * *